United States Patent
Tiebout et al.

(10) Patent No.: US 9,935,367 B2
(45) Date of Patent: *Apr. 3, 2018

(54) SYSTEM AND METHOD FOR A BEAMFORMER

(71) Applicant: Infineon Technologies AG, Neubiberg (DE)

(72) Inventors: Marc Tiebout, Finkenstein (AT); Andrew Stonehouse, Edinburgh (GB); Michele Caruso, Villach (AT); Angus McLachlan, Edinburgh (GB); Alan Harvey, Saline (GB); William MacIsaac, Crossford (GB); Johann Wuertele, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,818

(22) Filed: May 1, 2017

(65) Prior Publication Data

US 2017/0237164 A1 Aug. 17, 2017

Related U.S. Application Data

(63) Continuation of application No. 14/959,794, filed on Dec. 4, 2015, now Pat. No. 9,680,553.

(51) Int. Cl.
*H04L 27/00* (2006.01)
*H03C 3/00* (2006.01)
(Continued)

(52) U.S. Cl.
CPC ............ *H01Q 3/2682* (2013.01); *H01Q 3/36* (2013.01); *H04B 7/02* (2013.01); *H04B 7/04* (2013.01);
(Continued)

(58) Field of Classification Search
USPC ....... 375/141, 211, 219, 220, 221, 222, 240, 375/240.26–240.27, 254, 259, 278, 284,
(Continued)

(56) References Cited

U.S. PATENT DOCUMENTS 9,154,167 B1 10/2015 Lee et al.
9,172,569 B2 * 10/2015 Leenaerts ............ H04B 7/0617
(Continued)

OTHER PUBLICATIONS

Carosi, D., et al., "Delay Control in Wide Band Front-End Components for Multi-Role/Multi-Domain Phased-Array Systems," 2011 IEEE MTT-S International in Microwave Symposium Digest (MTT), Jun. 2011, 4 pages.
(Continued)

*Primary Examiner* — Linda Wong
(74) *Attorney, Agent, or Firm* — Slater Matsil, LLP

(57) ABSTRACT

In accordance with an embodiment a beamforming circuit having a radio frequency (RF) front end and a plurality of beamforming delay circuits coupled to the RF front end. Each of the plurality of beamforming delay circuits includes a common delay circuit and a plurality of individual delay circuits coupled to the common delay circuit. Each of the individual delay circuits are configured to be coupled to an antenna element of a beamforming array.

20 Claims, 9 Drawing Sheets

(51) Int. Cl.
*H01Q 3/26* (2006.01)
*H01Q 3/36* (2006.01)
*H04B 7/08* (2006.01)
*H04B 7/02* (2018.01)
*H04B 7/0413* (2017.01)
*H04B 7/04* (2017.01)

(52) U.S. Cl.
CPC .......... *H04B 7/0413* (2013.01); *H04B 7/086* (2013.01); *H04B 7/0897* (2013.01)

(58) Field of Classification Search
USPC ....... 375/285, 295, 316, 324, 340, 346, 347, 375/358, 349, 302
See application file for complete search history.

(56) References Cited

U.S. PATENT DOCUMENTS

| | | | |
|---|---|---|---|
| 9,344,176 B2 | 5/2016 | Braker et al. | |
| 2003/0043071 A1* | 3/2003 | Lilly | H01Q 3/22 342/368 |
| 2007/0093274 A1 | 4/2007 | Jafarkhani et al. | |
| 2009/0116575 A1* | 5/2009 | Hochwald | H04B 7/0671 375/267 |
| 2009/0231197 A1 | 9/2009 | Richards | |
| 2010/0228130 A1 | 9/2010 | Chiang et al. | |
| 2012/0162011 A1* | 6/2012 | Le Grange | H01Q 3/22 342/375 |
| 2013/0072247 A1 | 3/2013 | Park et al. | |
| 2013/0137381 A1 | 5/2013 | Vassiliou et al. | |
| 2013/0301619 A1* | 11/2013 | Singh | H04W 56/004 370/336 |
| 2013/0308717 A1 | 11/2013 | Maltsev et al. | |
| 2014/0072078 A1* | 3/2014 | Sergeyev | H04B 7/086 375/316 |
| 2014/0203969 A1* | 7/2014 | Maltsev | H01Q 3/36 342/375 |
| 2014/0357319 A1* | 12/2014 | Maltsev | G01S 3/38 455/562.1 |
| 2015/0094014 A1 | 4/2015 | Diamond et al. | |
| 2015/0126194 A1* | 5/2015 | Monteiro da Silva | H04B 7/0617 455/436 |
| 2015/0200455 A1 | 7/2015 | Venkateswaran et al. | |
| 2015/0303962 A1* | 10/2015 | Morton | H04B 1/28 455/333 |
| 2015/0372744 A1* | 12/2015 | Lehtinen | H01Q 3/2682 370/329 |
| 2016/0142922 A1 | 5/2016 | Chen et al. | |
| 2016/0150542 A1* | 5/2016 | Tarighat Mehrabani | H04W 16/28 370/329 |
| 2016/0261325 A1 | 9/2016 | Ko | |

OTHER PUBLICATIONS

Chu, T., et al., "An Integrated Ultra-Wideband Timed Array Receiver in 0.13 μm CMOS Using a Path-Sharing True Time Delay Architecture," IEEE Journal of in Solid-State Circuits, vol. 42, No. 12, Dec. 2007, 17 pages.

Han, Y., "Requirements on 5G Systems—A Perspective from Korea," 5G Forum, Dec. 2014, 39 pages.

Koochakzadeh, M. et al., "Miniaturized Transmission Lines Based on Hybrid Lattice-Ladder Topology," IEEE Transactions on Microwave Theory and Techniques, vol. 58, No. 4, Apr. 2010, 7 pages.

Longbrake, M., "True Time-Delay Beamsteering for Radar," 2012 IEEE National in Aerospace and Electronics Conference (NAECON), Jul. 2012, 4 pages.

Ma, Q., et al., "A 10-50GHz True-Time-Delay phase shifter with max 3.9% delay variation," 2014 IEEE in Radio Frequency Integrated Circuits Symposium, Jun. 2014, 4 pages.

Wilden, H., et al., "The SAR/GMTI Airborne Radar PAMIR: Technology and Performance," 2010 IEEE MTT-S International in Microwave Symposium Digest (MTT), May 2010, 4 pages.

* cited by examiner

SYSTEM AND METHOD FOR A BEAMFORMER

This application is a continuation of U.S. patent application Ser. No. 14/959,794, filed on Dec. 4, 2015, entitled "System and Method for a Beamformer", which application is hereby incorporated herein by reference in its entirety.

TECHNICAL FIELD

The present disclosure relates generally to an electronic device, and more particularly to a system and method for a beamformer.

BACKGROUND

An electronically steerable array antenna is an antenna system that includes an array of individual antenna elements that transmit a same radio frequency (RF) signal with different relative phases. Destructive and constructive interference of these RF signals may form a directional beam. By adjusting the phase relationship between the signals transmitted by these respective antenna elements, the direction of the beam may be adjusted using electronically steerable array beam steering methods known in the art. Such beamforming and beam steering methods may be applied, for example, to one-dimensional electronically steerable array antennas that have a single line of antenna elements, in which case the beam may be steered in a single direction. These techniques may also be applied to two-dimensional antenna arrays in which a beam may be electronically steered in two dimensions to adjust both an azimuth and elevation of the beam.

A common application that uses electronically steerable array beam steering techniques is that of a radar system. By using an electronically steerable array antenna, the direction of a transmitted and received radar signal may be adjusted using electronic beam steering techniques instead of mechanically moving an antenna. A further application of electronically steerable arrays is in cellular communications. By using a steerable beam, spatial multiplexing increases network capacity by multiplying the spectral efficiency.

SUMMARY

In accordance with an embodiment a beamforming circuit having a radio frequency (RF) front end and a plurality of beamforming delay circuits coupled to the RF front end. Each of the plurality of beamforming delay circuits includes a common delay circuit and a plurality of individual delay circuits coupled to the common delay circuit. Each of the individual delay circuits are configured to be coupled to an antenna element of a beamforming array.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
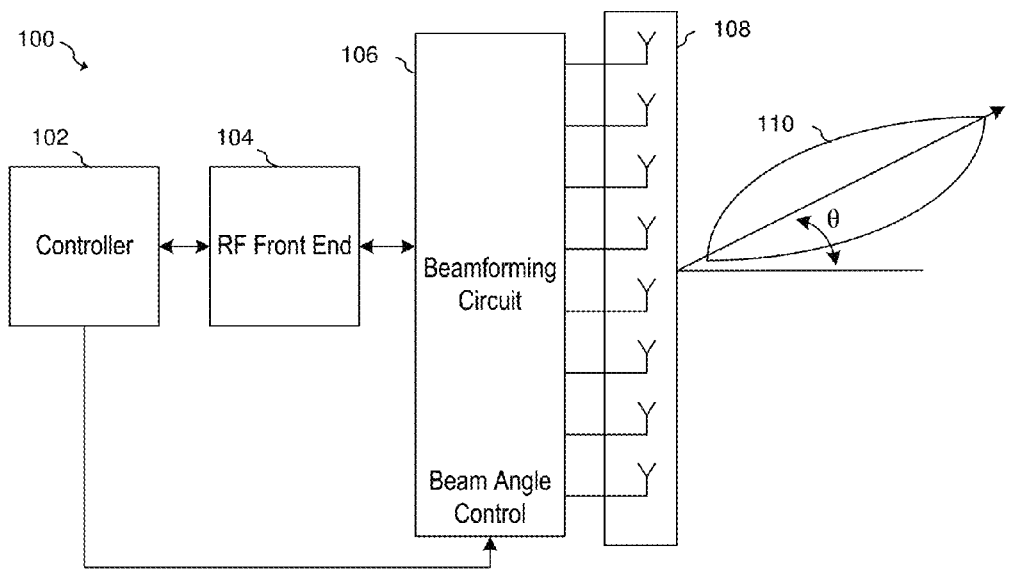
FIG. 1 illustrates an electronically steerable array RF system according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a beamforming antenna system that may be used in RF systems such as radar systems and cellular communication systems. Embodiments of the present invention may also be applied to other systems and applications that receive or transmit directional RF signals.

Traditionally, an electronically steerable antenna system is implemented using a phase steering approach in which phase shifters are used to adjust the phase of each signal transmitted by individual antenna elements of an electronically steerable array antenna. By adjusting the phase of each phase shifter, the direction of a beam may be adjusted in a particular direction for a particular frequency. However, when the frequency of transmission is changed, the relationship of the RF signal to the electronically steerable array antenna changes, thereby causing a change in direction of the beam. This change in direction is sometimes referred to as squint.

One alternative to the phase steering approach is the true time delay (TTD) approach in which time delay elements are used to delay the transmitted signal to respective elements of the multi-element antenna array. By using the TTD approach, the direction of the transmitted beam stays substantially constant over varying frequency for a given set of delays for the time delay element. Using the TTD approach allows for the directional transmission of broadband radar signals such as chirp radar and pulsed radar transmissions, as well as the directional transmission of wide band and multi-band communication signals. However, one issue with the TTD approach is the circuit area needed to implement each of the relatively large delays used to delay the signals to the multi-element antenna array. In embodiments of the present invention, the total amount of delay circuitry used to implement a TTD electronically steerable array system is reduced by using a combination of individual delay elements and shared common delay elements. For example, in one embodiment, a plurality of array elements are coupled to first ports of a plurality of corresponding individual delay circuits. The second port of each of these delay circuits is combined and coupled to a single common delay circuit such that the total delay for antenna element path is a sum of the delay of the respective individual delay circuit and the delay of the common delay circuit. In some embodiments, the delay in each individual delay circuit only needs to be sufficient for the purposes of beamforming between adjacent antenna elements, rather than for the complete antenna. Accordingly, the size of such an antenna can be reduced in size as compared to conventional antennas where each individual antenna must implement the whole delay.

FIG. 1 illustrates an embodiment of an electronically steerable array RF system 100 that includes controller 102, RF front-end 104, beamforming circuit 106 and electronically steerable array antenna 108. During operation, controller 102 determines a beam angle θ at which electronically steerable array antenna 108 transmits and receives RF beam no via a beam angle control port. In embodiments that utilize TTD techniques, controller 102 may provide a global relative time delay setting and/or time delay parameters and settings for each time delay circuit or for groups of time delay circuits within beamforming circuit 106. In some embodiments, for example, in cellular communication systems, controller 102 may perform baseband processing. RF front-end 104 provides and/or receives an RF signal to and from beamforming circuit 106. Beamforming circuit 106 provides individual RF signals to electronically steerable array antenna 108 that are delayed according to the requested beam angle and the spacing between antenna elements of the electronically steerable array antenna 108.

While FIG. 1 only shows the electronically steerable array antenna 108 as having eight antenna elements arranged as a one-dimensional array, in alternative embodiments of the present invention electronically steerable array antenna 108 may have greater or fewer than eight elements and/or may have its elements arranged in a multi-dimensional array. For example, in one specific embodiment, an 8×8 antenna array having a total of 64 antenna elements may be used.

Figure 2:
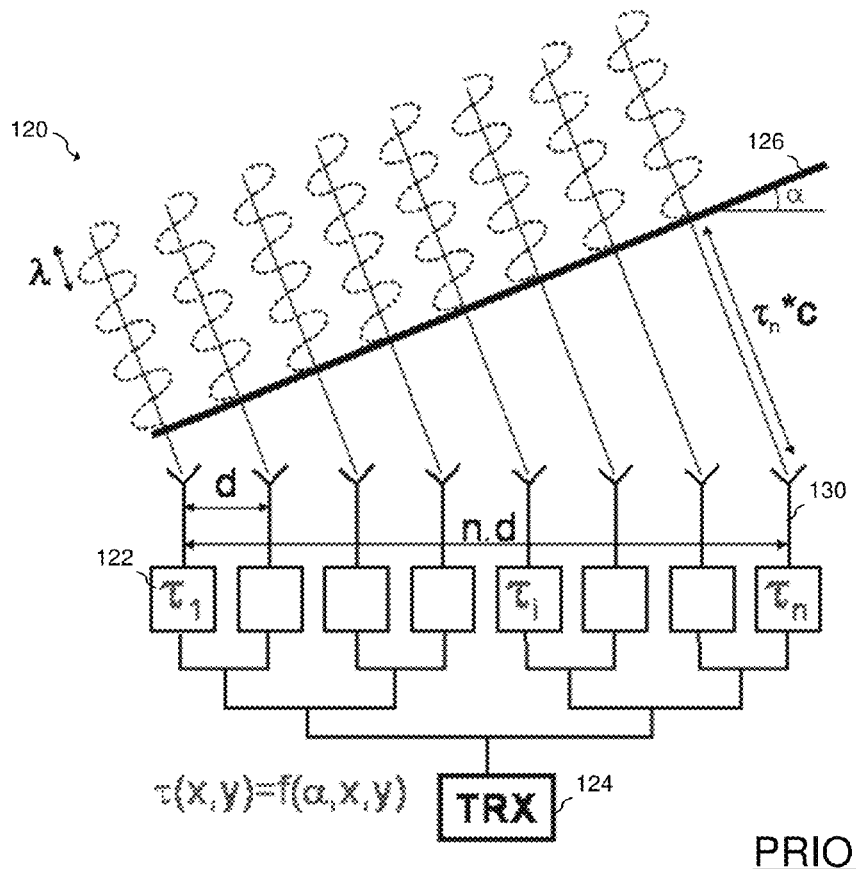
FIG. 2 illustrates a conventional True Time Delay (TTD) electronically steerable RF system.

FIG. 2 illustrates conventional TTD electronically steerable array RF system 120 having n antenna elements 130 and a beamforming circuit that includes n time delay elements 122, each of which has a different time delay $\tau_1$ to $\tau_n$. During operation, transceiver 124 transmits and receives RF signals to and from array antenna elements 130 that are individually delayed and via time delay elements 122.

As shown, each element of wave front 126 is spaced a distance d from each other, and wave front 126 forms an angle α with respect to a horizontal direction of array antenna elements 130. Accordingly, the difference in arrival time from delay of arrival of wave front 126 between each adjacent antenna element is:

$$\frac{d \sin \alpha}{c},$$

where c is the speed of light. Thus, the time delay range for time delay elements 122 is proportional to the number of array antenna elements 130, the antenna pitch, and the maximum steering angle. In one example, this delay range is about 300 ps for an electronically steerable array antenna system having n=8 antenna elements, a maximum steering angle of +/−60°, and a distance d of 15 mm between each antenna element.

Figure 3:
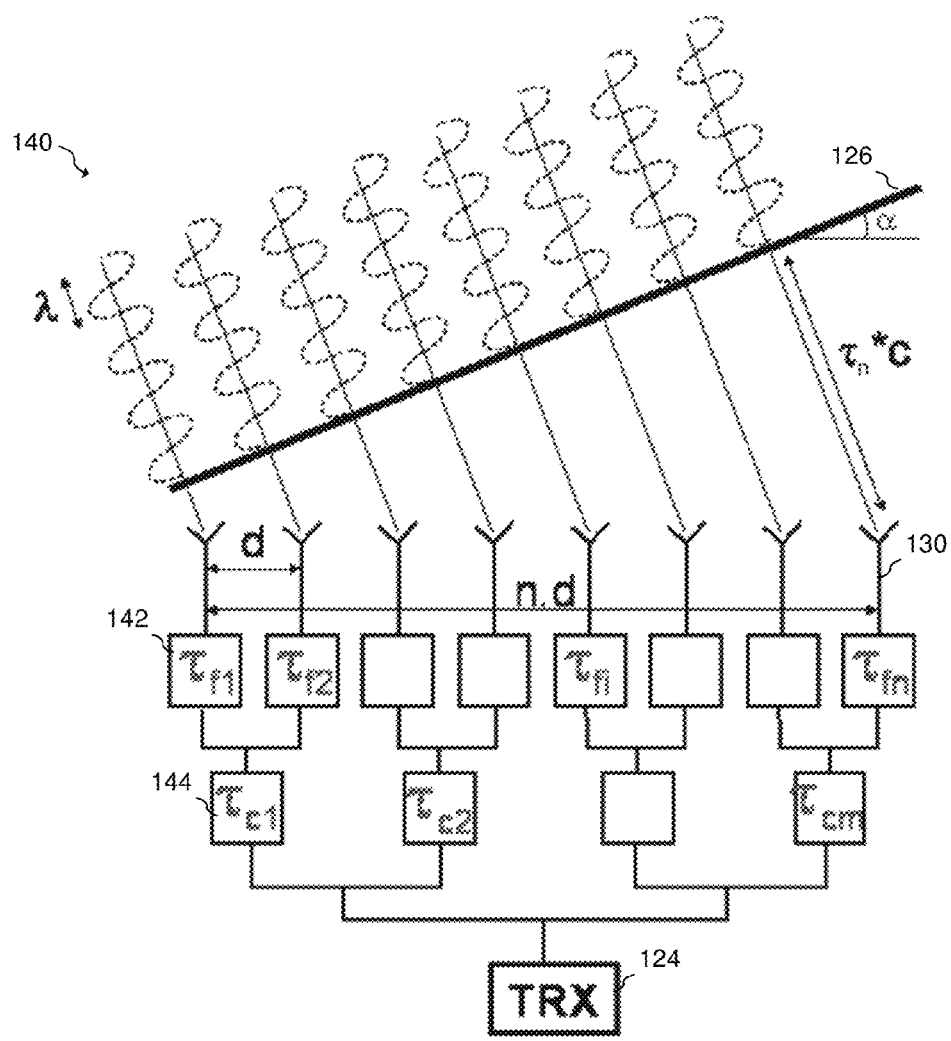
FIG. 3 illustrates an embodiment of a TTD electronically steerable RF system.

FIG. 3 illustrates an embodiment of an electronically steerable array RF system 140 in which the beamforming circuitry is split between common delay elements 144 and individual delay elements 142. As shown, transceiver 124 is coupled to m=n/2 common delay elements 144 having time delays $\tau_{c1}$ to $\tau_{cm}$, each of which are coupled to further individual delay elements 142. Accordingly, the total time delay between transceiver 124 and each antenna element 130 has a portion of its delay provided by one of common delay elements 144 and another portion provided by one of individual delay elements 142. In some embodiments, the portion provided by one of individual delay elements need only be sufficient for the purposes of beamforming between adjacent antenna elements, rather than for the complete antenna, and can therefore be much reduced in size.

In an embodiment, two neighboring antennas are configured to have a maximal delay difference of 1*d*sin(α), such that each individual delay element 142 implements a relatively small delay range. For example, common tuning elements may implement the main delay range (n−1)*d*sin (α), and are shared between two antennas leading to providing about half the total summed total delay for each antenna signal path. In an exemplary embodiment of n=8 and d=10 mm, the delays of common delay elements 144 range between about 0 ps and about 400 ps. On the other hand, delays of individual delay elements 142 range between about 0 ps and about 60 ps and are programmable in steps of smaller than 1 ps. In some embodiments, individual delay elements 142 and/or common delay elements 144 are have a continuously programmable delay range.

In alternative embodiments of the present invention, a common delay element 144 may be shared among larger numbers of individual delay elements 142. For example, four individual delay elements 142 may be coupled to each common delay element 144. Embodiments of the present invention may also be applied to two dimensional electronically steerable array systems having the same or different steering angles in azimuth and elevation.

Figure 4:
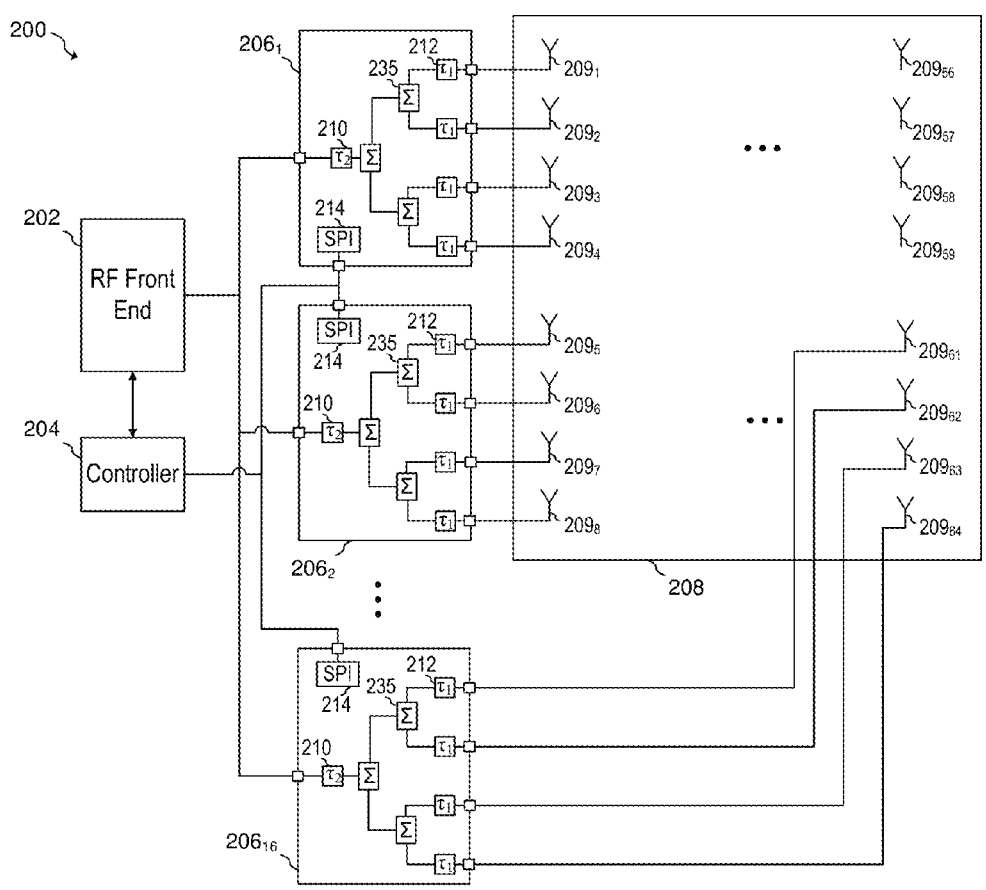
FIG. 4 illustrates a block diagram of an embodiment 8×8 electronically steerable RF system.

FIG. 4 illustrates 8×8 electronically steerable array RF system 200 that includes RF front-end 202 and controller 204 coupled to an 8×8 electronically steerable array antenna 208 via 16 four-channel electronically steerable array ICs $206_1$ to $206_{16}$. In an embodiment, each electronically steerable array IC $206_1$ to $206_{16}$ includes a common delay element 210 coupled to four individual delay elements 212 via power splitters/combiners 235. The delays $\tau_2$ of common delay element 210 and $\tau_1$ of individual delay elements 212 are programmable by controller 204 via serial peripheral interface (SPI) circuit 214 on each of electronically steerable array ICs $206_1$ to $206_{16}$. Alternatively, other types of digital interfaces may be used such as SCI, I²C or Ethernet.

Electronically steerable array antenna 208 includes antenna elements $209_1$ to $209_{16}$ to form an 8×8 array of 64 antenna elements. In alternative embodiments of the present invention, however, 208 may have different dimensions and the number of electronically steerable array ICs 206 may be different from the 16 as shown.

Figure 5A:
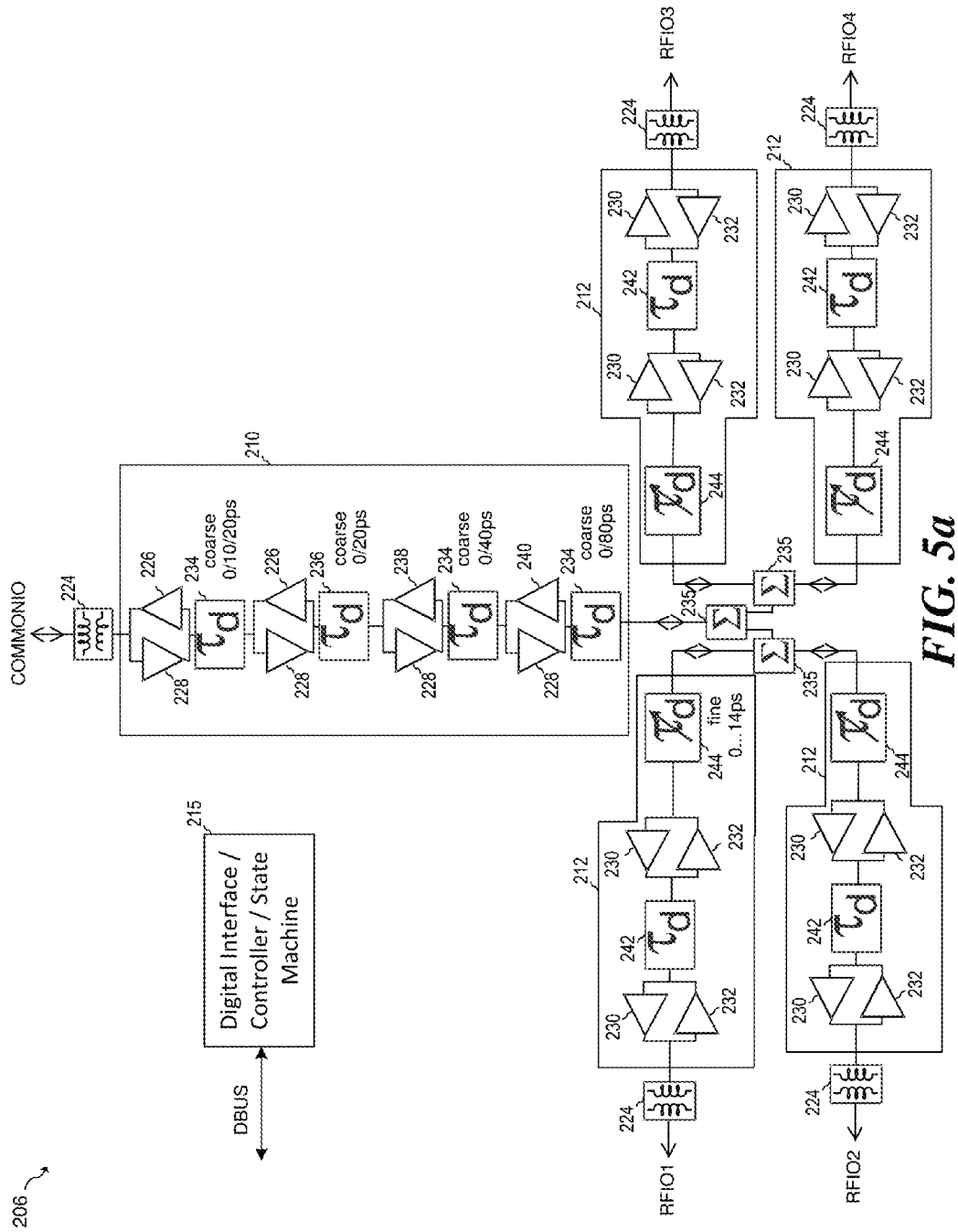
FIGS. 5a-5b illustrate block diagrams of embodiment of electronically steerable array integrated circuits.

FIG. 5a illustrates a block diagram of an embodiment of an electronically steerable array IC 206 that may be used to implement electronically steerable array ICs $206_1$ to $206_{16}$. As shown, electronically steerable array IC 206 includes common delay element 210 coupled to common RF interface pin RFIO and individual delay elements 212 coupled to interface pins $RFIO_1$, $RFIO_2$, $RFIO_3$ and $RFIO_4$ via transformers 224.

As shown, common delay element 210 includes a bidirectional path having coarse time delay circuits 234, 236, 238 and 240 buffered programmable gain amplifiers 228 and 226. Coarse delay element 234 has selectable delays of 0 ps, 10 ps and 20 ps, coarse time delay circuit 236 has selectable delays of 0 ps and tops, coarse time delay circuit 238 has selectable delays of 0 ps and 40 ps and coarse time delay circuit 240 has selectable delays of 0 ps and 80 ps. The delay of each selectable delay is programmable via digital control circuit 215. It should be understood that various delay settings for coarse delay elements 234, 236, 238 and 240 are example delay settings. In alternative embodiments of the present invention, greater or fewer than four coarse delay circuits may be used and/or other delay settings may be associated with each element.

Each individual delay element 212 includes a coarse time delay circuit 242 coupled to an IO pin via programmable gain amplifiers 230 and 232. Also included in individual delay elements 212 are fine time delay circuits 244 that have delays that may be programed to have a delay of between 0 ps and 14 ps. Alternatively, other time delay ranges may be used. Also in other technologies or at lower frequencies the coarse delay selection, can be implemented using switches instead of active amplifiers. Power splitters 235 split the transmitted power coming from common delay element 210 and combine the received power coming from individual delay elements 212. Power splitters 235 may be implemented, for example, using 3 dB power divider circuits known in the art such as Wilkinson splitters/combiners. Alternatively, other passive or active circuits may be used.

FIG. 5a also includes digital control circuit 215 that includes a digital interface, controller and state machine. In some embodiments, the digital interface is implemented using an SPI interface coupled to bus DBUS. In alternative embodiments, the digital interface may be implemented using other serial and/or parallel digital interface circuits that operate, for example, according to IIC, RFFE, SCI, Ethernet, other interface standards or a non-standard interface. In some embodiments, the digital interface functionality of digital control circuit 215 may be omitted. Digital control circuit 215 may also be used to control the individual fine and coarse delay circuits according to commands received from the digital interface. In some embodiments, digital control 215 maps delay setting commands received from bus DBUS into to individual fine and course delay settings based on mappings stored in memory and/or a lookup table (LUT).

In various embodiments, IC 206 as depicted in FIG. 5a may be used to support, for example, 28 GHz wireless communication over an 8×8 TTD antenna array having a pitch of 5 mm (½ λ). In further embodiments, other frequencies and antenna array dimensions may be supported by adjusting the various delay ranges.

Figure 5B:
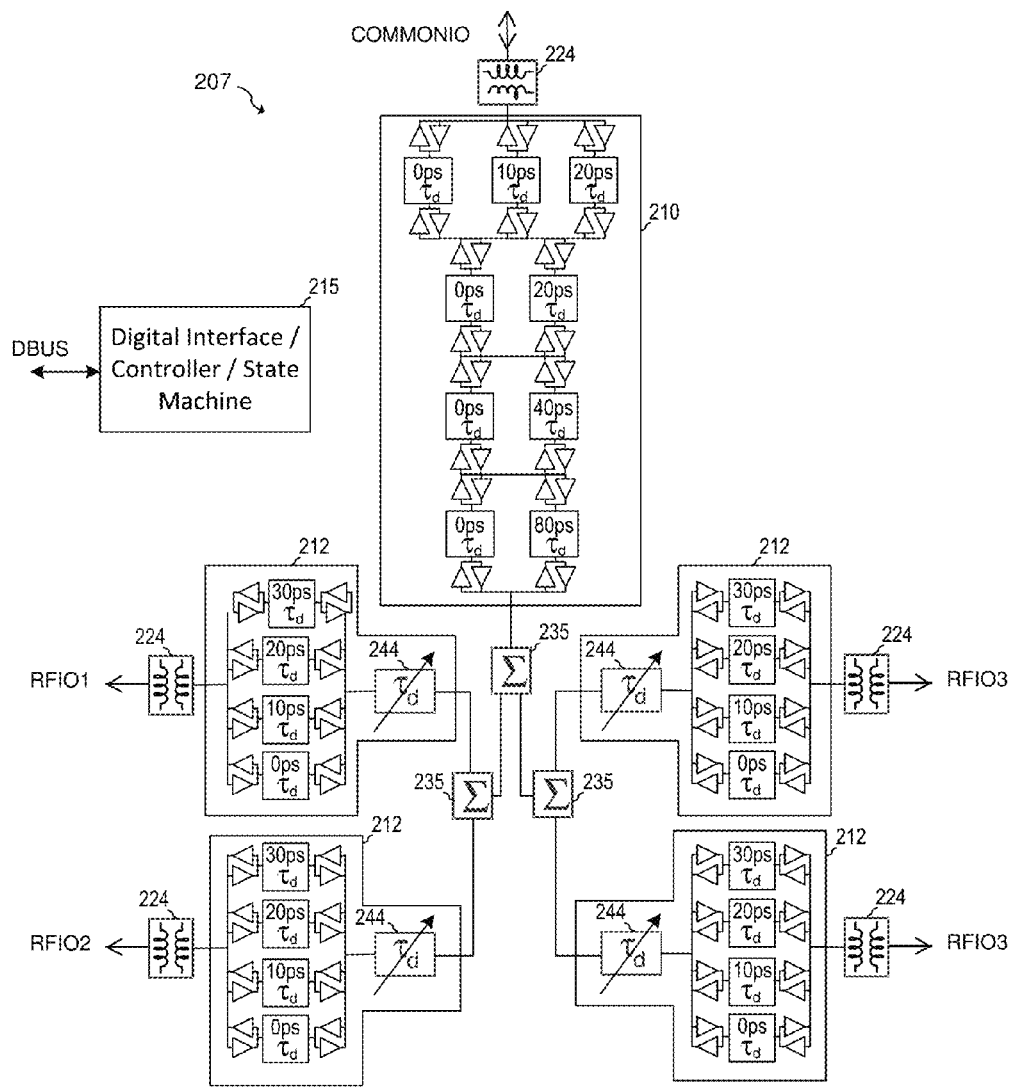

FIG. 5b illustrates a block diagram of an embodiment of an electronically steerable array IC 207 that may be used to implement electronically steerable array ICs $206_1$ to $206_{16}$ that shows one way in which the coarse time delay elements may be implemented. As shown, common delay element 210 is implemented using a plurality of buffered fixed delay circuits having various delay times that include 0 ps, 10 ps, 20 ps, 40 ps and 80 ps. In an embodiment, three parallel delay elements having fixed delays of about 0 ps, 10 ps and 20 ps are coupled to input COMMONIO. During operation, one of the 0 ps, 10 ps and 20 ps fixed delay elements are activated while the remaining two are disabled. Thus, a selectable delay of 0 ps, 10 ps or 20 ps may be chosen. Similarly, in the stage of common delay element 210, a fixed delay of 0 ps or 20 ps may be chosen, in the third stage, a fixed delay of 0 ps of 40 ps may be chosen, and in the fourth stage, a fixed delay of 0 ps or 80 ps may be chosen. Thus common delay element 210 may have a delay of between about 0 ps to about 160 ps that is selected by enabling and disabling the appropriate buffered delay elements.

Similarly, the course delay circuits individual delay elements 212 include four buffered delay elements coupled in parallel having individual delays of 0 ps, 10 ps, 20 ps and 30 ps, such that delays of 0 ps, 10 ps, 20 ps and 30 ps may be selected by activating and deactivating the appropriate stages. It should be understood that partitioning and individual values of the delay circuits in FIGS. 5a and 5b are just examples of many possible embodiment implementations. In alternative embodiments, greater and fewer delay elements having different delay values may be used.

Figure 6A:
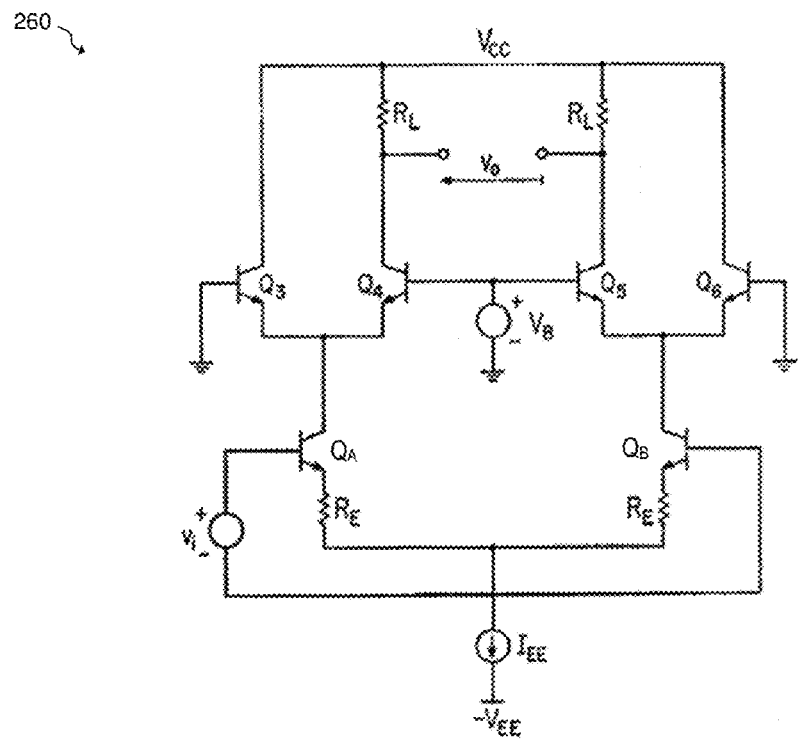
FIGS. 6a-6b illustrates schematics of embodiments of programmable amplifier circuits.
Figure 6B:
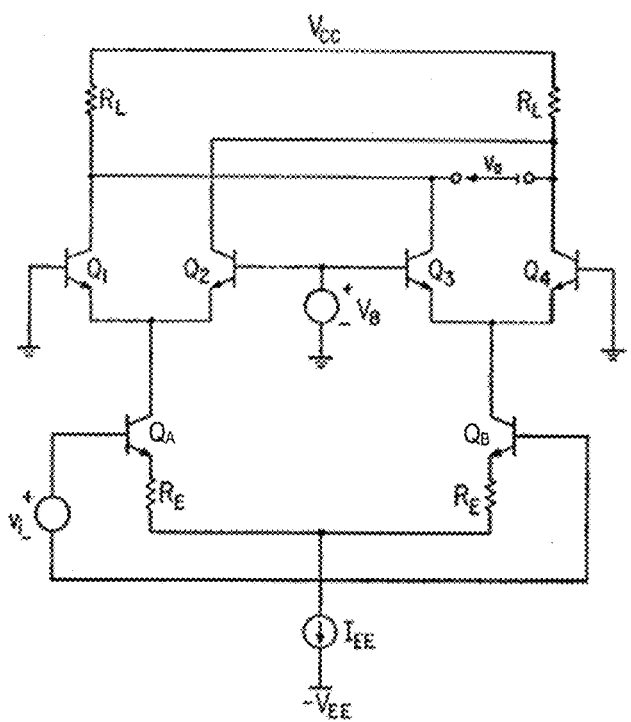

FIGS. 6a and 6b illustrate programmable gain amplifiers that may be used to implement programmable gain amplifiers 226, 228, 230 and 232. As shown in FIG. 6a, programmable gain amplifier 260 includes a resistor degenerated differential pair made of resistors $R_E$ and bipolar junction transistors (BJT) $Q_A$ and $Q_B$ having collectors coupled to a variable gain stage made of BJTs $Q_3$, $Q_4$, $Q_5$ and $Q_6$. As programmable gain bias voltage $V_B$ increases, more signal current is routed to load resistors $R_L$ and the gain accordingly increases. On the other hand, as the programmable gain bias voltage decreases, less signal current is routed to load resistors $R_L$ and the gain decreases. In some embodiments, programmable gain bias voltage $V_B$ is programmable via SPI circuit 214 shown in FIG. 4.

FIG. 6b illustrates programmable gain amplifier 262 having a resistor degenerated differential pair made of resistors $R_E$ and bipolar junction transistors (BJT) $Q_A$ and $Q_{2B}$ having collectors coupled to a four quadrant variable gain stage made of BJTs $Q_3$, $Q_4$, $Q_5$ and $Q_6$. By coupling the collectors of $Q_1$ and $Q_3$ to one output resistor $R_L$ and coupling the collectors of $Q_2$ and $Q_4$ to the other output resistor $R_L$, both the gain of and the polarity of programmable amplifier 262 may be adjusted. In alternative embodiments of the present invention, other transistor types besides BJT transistors may be used for programmable amplifiers 260 and 262. For examples MOSFETs, JFETs and other transistors types may be used. In addition, in further alternative embodiments, or variable gain amplifier structures known in the art may also be used besides the circuits shown in FIGS. 6a and 6b depending on the particular embodiment and its specifications. For example, in one embodiment, programmable gain amplifier 232 coupled to the RFIO ports of electronically steerable array IC 206 shown in FIGS. 5a and 5b may be implemented using a lower noise circuit, such as an LNA preceding a variable gain stage, a circuit similar to programmable gain amplifiers 260 and 262 without degeneration resistors $R_E$, or combination thereof.

Figure 7A:
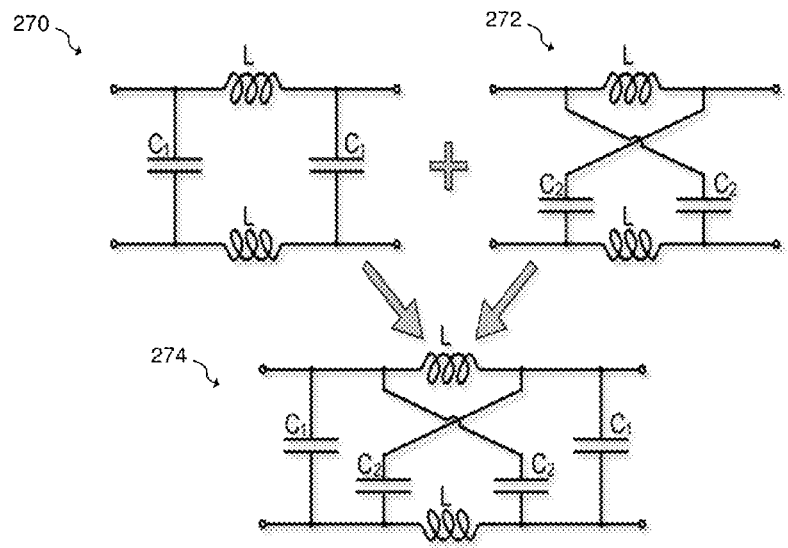
FIGS. 7a-7b illustrate schematics of embodiments of time delay circuits using filter structure.

FIG. 7a illustrates schematics of passive filter circuits 270, 272 and 274 that may be used to implement fine time delay circuit 244 shown in FIGS. 5a and 5b, as well as time delay circuits in other embodiments of the present invention. As shown, filter circuit 270 is a lowpass ladder filter that includes two inductors L and two capacitors $C_1$. Filter 270 has a group delay that increases with frequency. Filter 272, on the other hand is a lattice filter having inductors L and capacitors $C_2$, and exhibiting an all-pass frequency response in which the group delay decreases with frequency. By combining the lowpass topology of circuit 270 with the allpass topology of FIG. 272, a hybrid-cell topology is formed that has a more flat group delay characteristic over frequency depending on the ratio of $C_1$ to $C_2$. The impedance of filter circuit 274 can be expressed as:

$$Z_0 = \sqrt{\frac{L}{(C_1+C_2)}\left[1-\left(\frac{\omega}{\omega_c}\right)^2\right]^{-1}},$$

where $$\omega_c = \frac{1}{\sqrt{LC_1}}.$$

In embodiments of the present invention, circuits 270, 272 and/or 274 may be used to implement a programmable delay element by programming the values of inductors L and/or capacitors $C_1$ and/or $C_2$. The capacitors shown in passive filter circuits 270, 272 and 274 may be implemented using an adjustable capacitor circuit such as a switchable capacitor for discrete capacitance settings or a varactor for continuously adjustable settings.

Figure 7B:
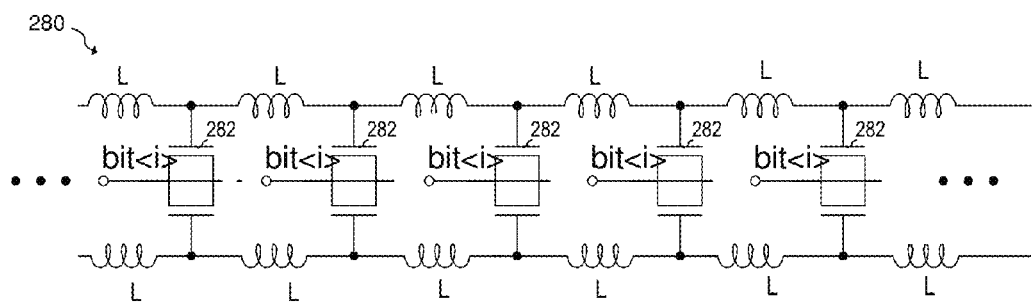

FIG. 7b illustrates a programmable filter structure 280 that may be used to implement fine time delay circuit 244. Programmable filter structure 280 has inductors L and varactors 282 that are each implemented using two MOSFET transistors whose capacitance is adjustable by changing the gate voltage of the MOSFETs. The capacitance of the MOSFETs may be adjustable in either the accumulation mode or the depletion mode. Inductors L may be implemented using on-chip inductor structures known in the art. For example, a spiral inductor may be implemented in a first metal layer and/or a second spiral inductor may be implemented on a second metal layer that is either above or below the first metal layer. While programmable filter structure 280 is shown having six stages, embodiment programmable filter structure 280 may have greater or fewer than six stages depending on the particular embodiment and its specifications.

Figure 8A:
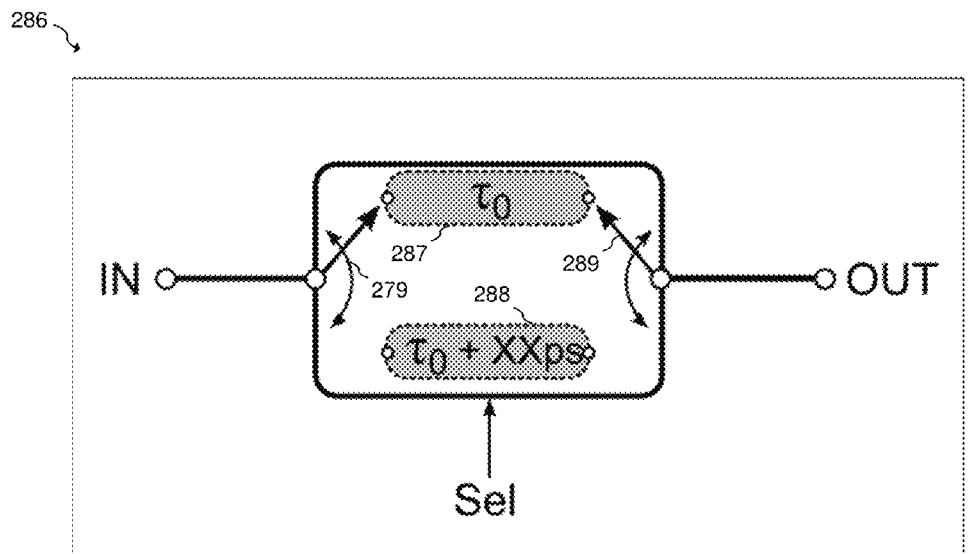
FIGS. 8a-8b illustrate schematics of embodiments of time delay circuits using selectable delays.

FIG. 8a illustrates a block diagram of coarse delay circuit 286 that may be used to implement embodiment delay circuits including coarse delay circuits 234, 236, 238, 240 and 242 shown in FIGS. 5a and 5b. As shown, coarse delay circuit 286 includes a first delay path 287 having delay $\tau_0$ and a second delay path 288 having delay $\tau_0+XX$ ps. In an embodiment, first and second delay paths 287 and 288 are selectable using switches 279 and 289 that are controlled by selection signal Sel. First and second delay paths 287 and 288 may be implemented using delay circuits disclosed herein or other using other delay circuits known in the art. While only two delay paths are shown in FIG. 8a for convenience of illustration, coarse delay circuit 286 may include greater than two delay paths for the ability to select multiple delays.

Figure 8B:
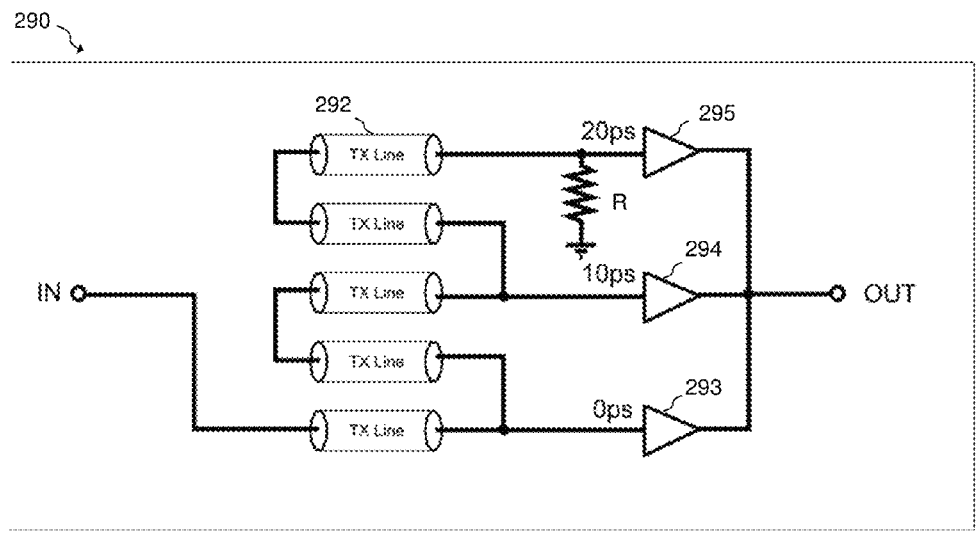

FIG. 8b illustrates a block diagram of coarse delay circuit 290 that may be used to implement embodiment delay circuits including coarse delay circuits 234, 236, 238, 240 and 242 shown in FIGS. 5a and 5b. As shown, coarse delay circuit 290 includes five tapped transmission line segments 292 that are terminated by resistors R. Amplifiers 293, 294 and 295 are coupled between various transmission line segments 292 in order to provide relative delays of 0 ps, 10 ps and 20 ps, respectively. Each of amplifiers 293, 294 and 295 may be selected by turning on the bias current of the amplifier corresponding to the selected transmission line segments and turning off the bias current of the amplifiers corresponding to unselected transmission line taps. Alternatively, other amplifier activation and deactivation methods known in the art may be used to select from one of amplifiers 293, 294 and 295. In alternative embodiments, greater or fewer than five transmission line segments and three amplifiers may be used. Moreover, other selectable delays besides 0 ps, 10 ps and 20 ps may be provided by adjusting the length and number of transmission line segments 292. In some embodiments, coarse delay circuit 290 may be replicated in order to provide separate delay paths in the transmit direction and in the receive direction.

Figure 9:
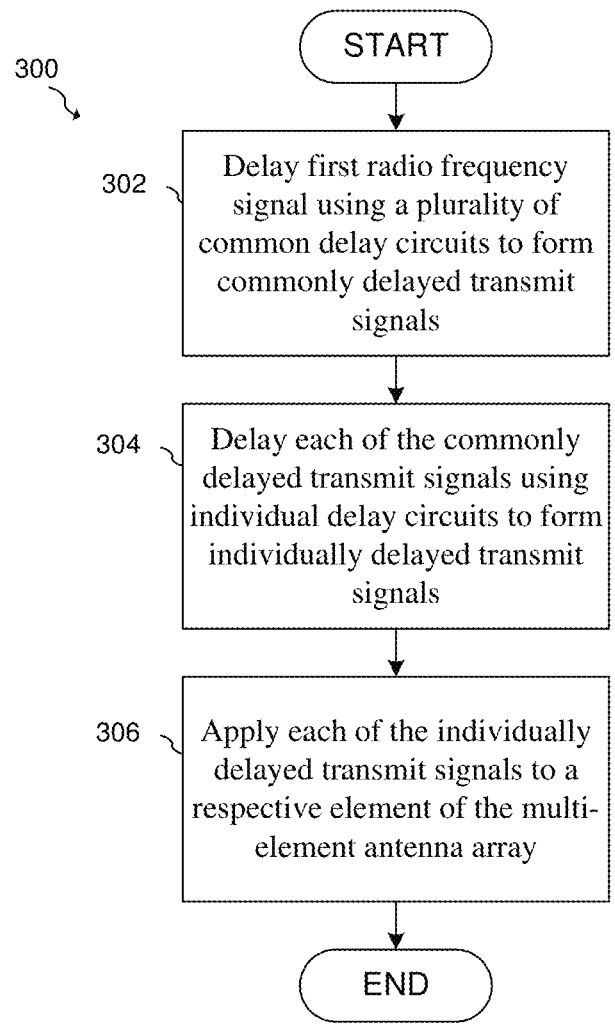
FIG. 9 illustrates a block diagram of an embodiment of a beamforming method.

FIG. 9 illustrates a block diagram 300 of an embodiment beamforming method that includes transmitting a first radio frequency signal to a multi-element antenna array. In step 302, the first radio frequency signal is transmitted using a plurality of common delay circuits to form commonly delayed transmit signals. Next, in step 304, each of the commonly delayed transmit signals is delayed using individual delay circuits to form individually delayed transmit signals. In some embodiments, each commonly delayed transmit signal is associated with at least two individual delay circuits. In step 306, each of the individually delayed transmit signals is applied to a respective element of the multi-element antenna array. In various embodiments, the common delay circuits and the individual delay circuits may be implemented using circuits and methods described herein.

Embodiments of the present invention are summarized here. Other embodiments can also be understood from the entirety of the specification and the claims filed herein. One general aspect includes a beamforming circuit that includes a radio frequency (RF) front end and a plurality of beamforming delay circuits coupled to the RF front end. Each of the plurality of beamforming delay circuits includes a common delay circuit and a plurality of individual delay circuits coupled to the common delay circuit. Each of the individual delay circuits are configured to be coupled to an antenna element of a beamforming array.

Implementations may include one or more of the following features. The beamforming circuit where each individual delay circuit of the plurality of individual delay circuits provides sufficient delay for the purposes of beamforming only between adjacent antenna elements. In some embodiments, the common delay circuit includes a coarse delay circuit having discrete selectable time delay steps. This coarse delay circuit may include, for example, a plurality of selectable transmission lines. The plurality of selectable transmission lines may include a first set of transmission lines for a transmit direction and a second set of transmission lines for a receive direction.

In some embodiments, the coarse delay circuit includes a plurality of selectable allpass circuits. The plurality of allpass circuits may include a first set of allpass circuits for a transmit direction and a second set of allpass circuits for a receive direction. In some embodiments, each individual delay circuit includes a fine delay circuit having a continuously variable delay. The fine delay circuit may include tunable allpass filter. Each individual delay circuit may be implemented, for example, using a fine delay circuit having a digitally programmable delay. In some embodiments, the beamforming delay circuit includes a plurality of beamforming delay circuits.

In an embodiment, the beamforming circuit further includes a plurality of antenna interface circuits, where each of the plurality of antenna interface circuits are coupled to corresponding individual delay circuits of the plurality of beamforming delay circuits. Each antenna interface circuit includes, for example, a transmit amplifier and a receive amplifier. In some embodiments, the RF front end includes a radar transceiver. The beamforming circuit may further including an antenna array having individual antenna elements coupled to corresponding individual delay circuits of the plurality of beamforming delay circuits.

A further general aspect includes a method of beamforming that includes the steps of transmitting a first radio frequency signal to a multi-element antenna array, where the transmitting includes delaying the first radio frequency signal using a plurality of common delay circuits to form commonly delayed transmit signals. The method further includes delaying each of the commonly delayed transmit signals using individual delay circuits to form individually delayed transmit signals and applying each of the individually delayed transmit signals to a respective element of the multi-element antenna array. Each commonly delayed transmit signal may be associated with at least two individual delay circuits.

Implementations may include one or more of the following features. The method further including receiving a second radio frequency signal via the multi-element antenna array, where receiving includes receiving a plurality of second radio frequency signals from individual elements of the multi-element array, delaying the plurality of second radio frequency signals using corresponding individual delay circuits to form individually delayed receive signals, combining subsets of individually delayed receive signals to form a plurality of combined individually delayed receive signals, delaying each of the plurality of combined individually delayed receive signals using the plurality of common delay circuits to form commonly delayed receive signals, and combining the commonly delayed receive signals to form a combined second radio frequency signal. The method may further include generating the first radio frequency signal using a radio frequency front-end circuit and receiving the combined second radio frequency signal using the radio frequency front-end circuit.

In some embodiments, generating the first radio frequency signal includes generating a radar signal. The method may also include adjusting delays of the plurality of common delay circuits and adjusting delays of the individual delay circuits. In some embodiments, adjusting the delays of the plurality of common delay circuits includes selecting a transmission path among a plurality of selectable transmission lines and adjusting the delays of the individual delay circuits includes adjusting a frequency of an allpass filter.

A further general aspect includes a radio frequency system including a radio frequency front-end circuit, a multi-element antenna array, and a plurality of true time-delay beamforming circuits coupled to an interface port of the radio frequency front-end circuit. Each true-time delay beamforming circuit includes a first delay circuit having a first port coupled to an interface port of the radio frequency front-end circuit, and a plurality of second delay circuits coupled between a second port of the first delay circuit and corresponding elements of the multi-element array.

Implementations may include one or more of the following features. The radio frequency system where each of the plurality of true time-delay circuits is disposed on an integrated circuit. The multi-element array may include, for example, an 8×8 array. In some embodiments, a direction of a beam produced by the plurality of true time-delay beamforming circuits and the multi-element antenna array is substantially independent of frequency.

Advantages of some embodiment directional couplers include the ability to provide a steerable beam in a true time delay (TTD) electronically steerable array system using less circuitry and less power than a TTD system using only individual time delays for each antenna element of an electronically steerable array antenna. Further advantages of some embodiments include providing a cost efficient TTD integrated circuit that uses less circuits than conventional board-based realizations that use striplines and RF-switches.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A beamforming circuit comprising:
a plurality of beamforming delay circuits configured to be coupled to an radio frequency (RF) port of an RF front end and configured to propagate an RF signal, each of the plurality of beamforming delay circuits comprising
a common delay circuit configured to be coupled to the RF port, and
a plurality of individual delay circuits coupled to the common delay circuit, wherein each of the individual delay circuits are configured to be coupled to an antenna element of a beamforming array and are configured to propagate the RF signal to or from the antenna element of the beamforming array.

2. The beamforming circuit of claim 1, wherein each individual delay circuit of the plurality of individual delay circuits provides a delay of $d*\sin(\alpha)$, where d is a distance between adjacent antenna elements and $\alpha$ is a maximum steering angle.

3. The beamforming circuit of claim 1, wherein the common delay circuit comprises a coarse delay circuit having discrete selectable time delay steps.

4. The beamforming circuit of claim 3, wherein the coarse delay circuit comprises a plurality of selectable transmission lines.

5. The beamforming circuit of claim 3, wherein the coarse delay circuit comprises a plurality of selectable allpass circuits.

6. The beamforming circuit of claim 5, wherein the plurality of selectable allpass circuits comprises a first set of allpass circuits for a transmit direction and a second set of allpass circuits for a receive direction.

7. The beamforming circuit of claim 1, wherein each individual delay circuit comprises a fine delay circuit having a continuously variable delay.

8. The beamforming circuit of claim 1, wherein each individual delay circuit comprises a fine delay circuit having a digitally programmable delay.

9. The beamforming circuit of claim 8, wherein the fine delay circuit comprises tunable allpass filter.

10. The beamforming circuit of claim 1, further comprising a plurality of antenna interface circuits, wherein each of the plurality of antenna interface circuits are coupled to corresponding individual delay circuits of the plurality of beamforming delay circuits.

11. The beamforming circuit of claim 10, wherein each antenna interface circuit comprises a transmit amplifier and a receive amplifier.

12. The beamforming circuit of claim 1, further comprising an antenna array having individual antenna elements coupled to corresponding individual delay circuits of the plurality of beamforming delay circuits.

13. A method of beamforming comprising:
receiving a radio frequency signal via a multi-element antenna array, receiving comprising
receiving a plurality of radio frequency signals from individual elements of the multi-element antenna array,
delaying the plurality of radio frequency signals using corresponding individual delay circuits to form individually delayed receive signals,
combining subsets of individually delayed receive signals to form a plurality of combined individually delayed receive signals,
delaying each of the plurality of combined individually delayed receive signals using a plurality of common delay circuits to form commonly delayed receive signals, and
combining the commonly delayed receive signals to form a combined radio frequency signal.

14. The method of claim 13, further comprising receiving the combined radio frequency signal using a radio frequency front-end circuit.

15. The method of claim 13, further comprising:
adjusting delays of the plurality of common delay circuits; and
adjusting delays of the individual delay circuits.

16. The method of claim 15, wherein:
adjusting the delays of the plurality of common delay circuits comprises selecting a transmission path among a plurality of selectable transmission lines; and
adjusting the delays of the individual delay circuits comprises adjusting a frequency of an allpass filter.

17. A radio frequency system comprising:
a plurality of true time-delay beamforming circuits configured to be coupled to a radio frequency port of a radio frequency front-end circuit, each of the plurality of true-time delay beamforming circuits comprising a first delay circuit having a first port configured to be coupled to the radio frequency port of the radio frequency front-end circuit, and a plurality of second delay circuits coupled between a second port of the first delay circuit and corresponding elements of a multi-element antenna array, wherein the first delay circuit and the plurality of second delay circuits are configured to propagate a radio frequency signal.

18. The radio frequency system of claim 17, wherein each of the plurality of true time-delay beamforming circuits is disposed on an integrated circuit.

19. The radio frequency system of claim 17, further comprising the multi-element antenna array.

20. The radio frequency system of claim 19, wherein:
a radio frequency beam is produced by the plurality of true time-delay beamforming circuits and the multi-element antenna array, and
a direction of the radio frequency beam is substantially independent of frequency.

* * * * *